Jan. 19, 1954  A. E. CARLILE  2,666,251
MANUFACTURE OF SLIDE FASTENERS
Filed Aug. 20, 1948  9 Sheets-Sheet 1

Inventor
Alfred E. Carlile

Jan. 19, 1954 A. E. CARLILE 2,666,251
MANUFACTURE OF SLIDE FASTENERS
Filed Aug. 20, 1948 9 Sheets-Sheet 2

Inventor
Alfred E. Carlile
By Bailey, Stephens & Huettig
Attorneys

INVENTOR.
ALFRED E. CARLILE
BY

ATTORNEY

Jan. 19, 1954

A. E. CARLILE 2,666,251

MANUFACTURE OF SLIDE FASTENERS

Filed Aug. 20, 1948

Inventor

Alfred E. Carlile

By Bailey, Stephens & Huettig

Attorneys

Jan. 19, 1954     A. E. CARLILE     2,666,251
MANUFACTURE OF SLIDE FASTENERS Filed Aug. 20, 1948     9 Sheets-Sheet 5

Inventor
Alfred E. Carlile
By Bailey, Stephens & Huettig
Attorneys

Jan. 19, 1954 — A. E. CARLILE — 2,666,251
MANUFACTURE OF SLIDE FASTENERS
Filed Aug. 20, 1948 — 9 Sheets-Sheet 6

Inventor
Alfred E. Carlile
By Bailey, Stephens & Huettig
Attorneys

Jan. 19, 1954     A. E. CARLILE     2,666,251
MANUFACTURE OF SLIDE FASTENERS
Filed Aug. 20, 1948     9 Sheets-Sheet 7

Inventor
Alfred E. Carlile

By Bailey, Stephens & Huettig
Attorneys

Jan. 19, 1954      A. E. CARLILE      2,666,251
MANUFACTURE OF SLIDE FASTENERS
Filed Aug. 20, 1948      9 Sheets-Sheet 8

Patented Jan. 19, 1954

2,666,251

UNITED STATES PATENT OFFICE 2,666,251

MANUFACTURE OF SLIDE FASTENERS

Alfred E. Carlile, Brooklyn, N. Y., assignor, by mesne assignments, to Talon, Inc., a corporation of Pennsylvania Application August 20, 1948, Serial No. 45,331

43 Claims. (Cl. 29—34)

The invention relates to the manufacture of slide fasteners, and more particularly to a machine for forming slide fastener scoops or elements and setting them on a tape.

Efforts have been made for many years to produce a satisfactory slide fastener of small size (the so-called "No. 2" fastener), especially for use in clothing. Machines have been developed for this purpose, but for various reasons they have not been really satisfactory. The fasteners produced have been lacking in strength and durability, because of the manipulations to which the scoops are subjected during their forming and setting. Furthermore, the machines have been large, complicated and expensive, requiring numerous skilled operators, and have been subject to breakdowns requiring costly repairs.

The primary object of the present invention is to provide a machine for the manufacture of slide fastener elements which overcomes the disadvantages of the devices heretofore known.

Another object of the invention is to provide a machine which so manipulates the scoops, during their formation and setting, that they are not weakened, so that the resulting fastener, even if of small size, is strong and durable.

A further object of the invention is to provide a machine of such simple and small construction that it is inexpensive and easy to operate and repair, being so arranged that several of the machines can be controlled by a single operator.

In general, the invention contemplates a machine in which scoop blanks are sheared from a Y-shaped wire, are then simultaneously gripped and formed at a first station by an oscillating die and punch, and are then carried by oscillation of the die and punch to a second station where they are clamped on the tape. The feeding of the bead of the tape between the legs of the scoop and the pressing of the legs together on this bead are controlled by the oscillation of the die and punch.

Further, I provide means for feeding proper lengths of wire to the blank shearing device, means for feeding the tape step by step, and means for intermittent rapid feed of the tape to provide gaps between successive groups of fasteners.

Further objects and advantages of the invention will appear more fully from the following description, especially when taken in conjunction with the accompanying drawings which form a part thereof.

In the drawings:

Figs. 17A to 17D show the parts of this mechanism in four different positions, substantially in cross-section on the line 17—17 of Fig. 16;

Figures 1, 21, 22, 31:
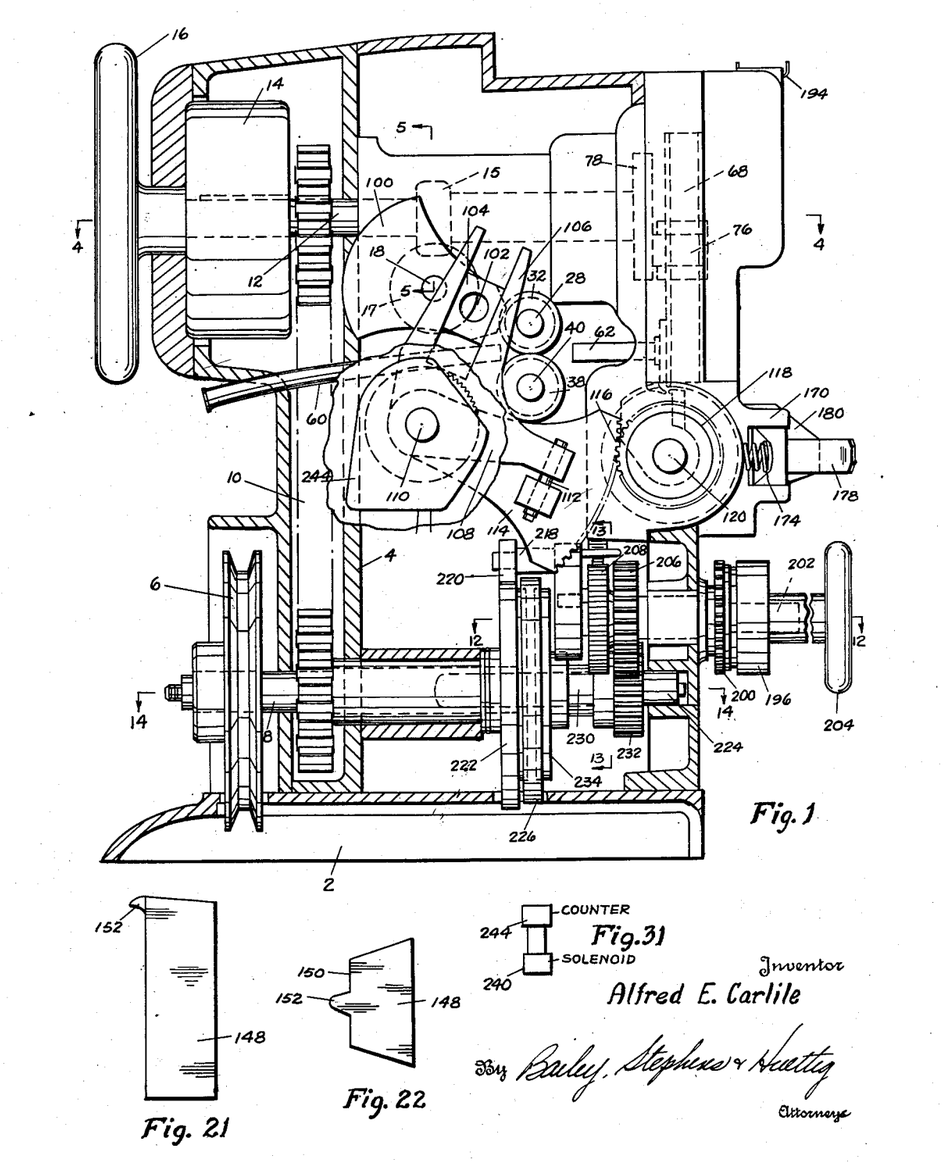
Fig. 1 shows, in side elevation, with parts broken away, a form of machine embodying my invention.
Fig. 21 is an enlarged side view of the punch member.
Fig. 22 is an enlarged top plan view thereof.
Fig. 31 is an electric circuit diagram thereof.
Figure 3:
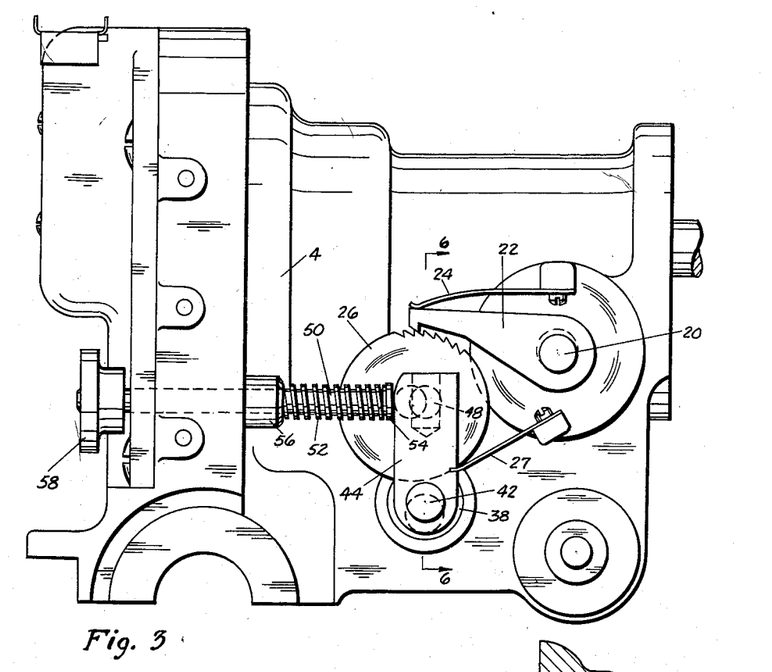
Fig. 3 is a view of a part of the machine from the opposite side from Fig. 1.
Figures 4, 10:
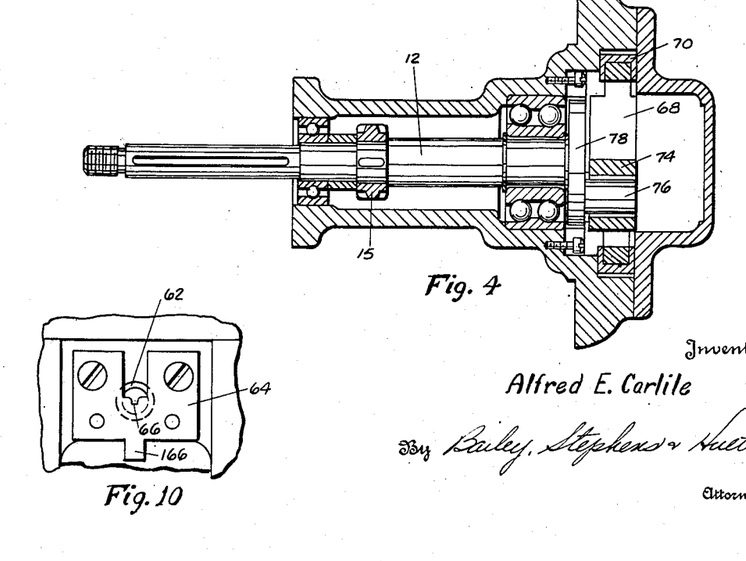
Fig. 4 is a cross-section through a portion of the knife drive mechanism substantially on the line 4—4 of Fig. 1.
Fig. 10 shows in front elevation the stationary knife member.
Figures 5, 8, 9, 11:
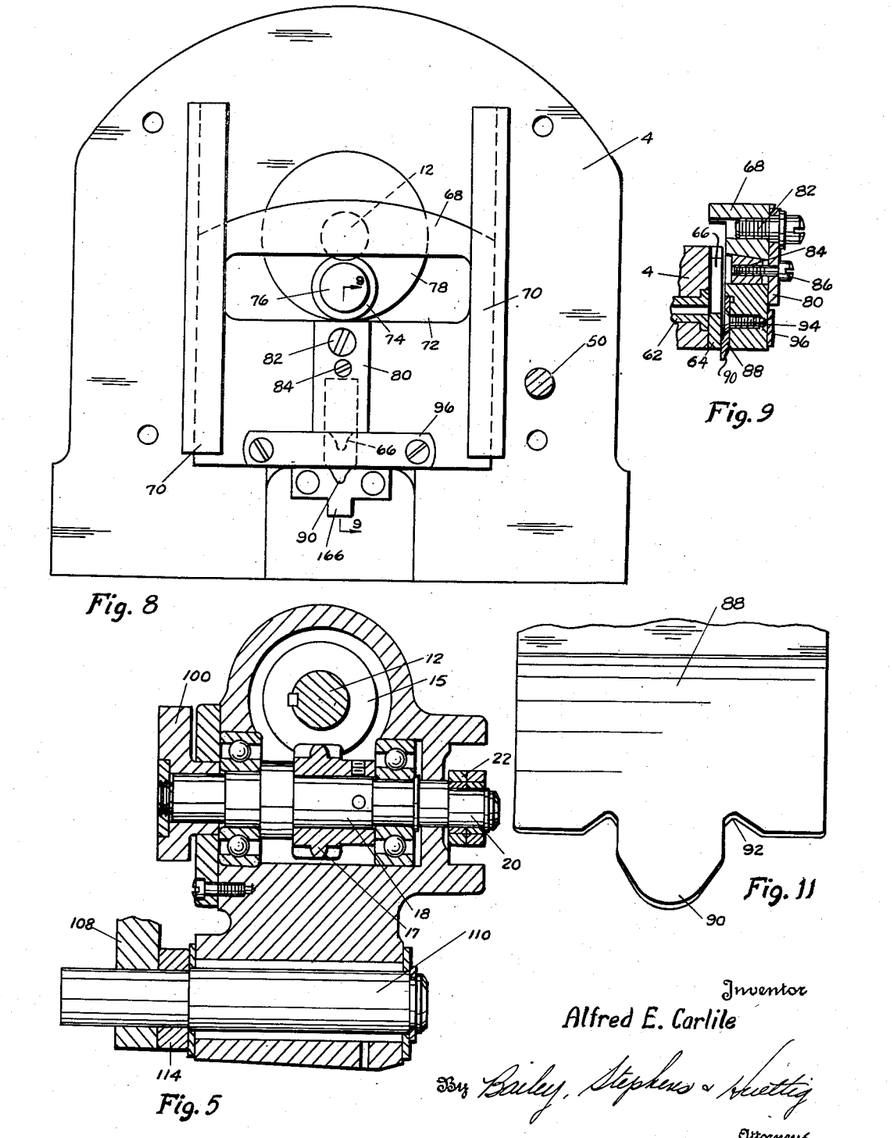
Fig. 5 is a cross-section substantially on the line 5—5 of Fig. 1.
Fig. 8 is a front view of the knife drive, with parts removed.
Fig. 9 is a cross-section on the line 9—9 of Fig. 8.
Fig. 11 is an enlarged front view of the movable knife member.

The machine as shown in Fig. 1 includes a base 2 and a casing 4. The machine may be driven in any suitable manner, for example by a pulley 6 mounted on lower main shaft 8. This shaft through a chain and sprocket connection 10 drives knife operating shaft 12 which carries a fly wheel 14 for the purpose of steadying its motion and may be turned manually by hand wheel 16. Shaft 12 through gears 15, 17 drives continuously a transverse shaft 18. Shaft 18 has on one end an eccentric or crank portion 20 (see Figs. 3 and 5). Pivoted on this eccentric portion is a pawl 22 pressed by spring 24 into engagement with the teeth of a ratchet wheel 26 mounted on shaft 28. A second spring 27 has a toothed end engaging the teeth of ratchet wheel 26 so as to prevent backward movement of the shaft 28. On the other end of shaft 28 are a gear 30 and a male wire feeding wheel 32 (see Fig. 6). A second shaft 34 mounted parallel and adjacent to shaft 28 carries a gear 36 meshing with gear 30 and a female wire feeding wheel 38 mating with wheel 32. Wheel 38 is mounted on an eccentric end portion 40 of shaft 34 so that turning of this shaft will move the wheel 38 towards and from wheel 32 to vary the pressure on wire being fed through the wheel. The other end portion 42 of shaft 34 has secured to it a lever 44 having in its top end a recess 46 in which engages a ball 48 on the end of a stem 50 so as to provide a feed wheel tensioning device. A spring 52 engages between a collar 54 on stem 50 and a fixed portion 56 of the casing 4 so as to urge the lever 44 clockwise in Fig. 3 and to push wheel 38 resiliently up towards wheel 32. The amount of this movement may be regulated by a thumb wheel 58 threaded on the end of stem 50, and arranged to abut against the casing to limit the clockwise movement of lever 44.

Wheels 32 and 38 are arranged to feed a wire of the type known for use in manufacture of slide fasteners, this wire being of generally Y-shape, with the legs of the Y adapted to form the legs of a slide fastener scoop, and the stem of the Y to form the head. This wire is fed through in upright position, that is, with the stem of the Y engaging in the groove of wheel 38 and the legs engaging over the peripheral rib of wheel 32. The wire is directed up to the feeding wheels by pipe 60, and after emerging from the wheels is guided by pipe 62 to the knife cutting mechanism now to be described.

The knife cutting mechanism (see Figs. 4, 8, 9 and 10) includes a stationary shearing member 64 having a central notch 66 for guiding the stem of the Y shaped wire. The movable knife 88 is carried by a block 68 (see Fig. 8) guided for up and down vertical movement by guides 70. Block 68 has a transverse slot 72 in which engages by roller 74 a crank pin 76 mounted on disc 78 rigid with shaft 12. Secured in a notch in the bottom part of block 68 is a knife holding member 80 which is secured to block 68 by screw 82 and the vertical position of which can be adjusted by a block 84 having an inclined surface and held in position by bolt 86 between block 68 and knife carrier 80. The movable knife 88, shown in detail in Fig. 11, has a downwardly projecting point 90 adapted to engage between the legs of the Y-shaped wire and notches 92 for receiving the ends of these legs. This knife is secured to the knife carrier 80 by a screw 94, the end of which engages a spring strap 96 on the other face of the knife carrier which acts to prevent turning of the screw and to ensure the proper holding of the knife 88 in position on the carrier.

Shaft 18 on its other end carries a crank member 100 (see Figs. 1, 2b and 5), which through crank pin 102 and block 104 engages in forked arms 106 of lever 108 mounted on shaft 110. This lever through adjustable threaded connection 112 drives a lever 114 having at its end a segmental rack portion 116. Rack 116 engages a gear 118 forming a part of the scoop forming and setting mechanism now to be described.

Referring particularly to Figs. 15 to 20, gear 118 is mounted to turn to a limited extent on a shaft 120. Limitation of the movement is provided by the formation in the inner periphery of gear 118 of two opposed notches 122 (see Fig. 18) within which engage the ends of a key 124 passing through and secured in shaft 120. Shaft 120 is mounted in bearings 126 in the frame and carries at its inner end an annular member 128 forming a part of the forming and setting drum. Opposed to shaft 120 is a generally similar shaft 130, likewise mounted in bearings 126, and having an annular inner portion 132 likewise forming a part of the forming and setting drum mechanism.

The inner ends of shafts 120, 130 have opposed recesses in which is turnably mounted a shaft 134. Secured on this shaft is a die carrying arm 136 which is movable in opposed notches 138 formed in the inner meeting faces of the members 128, 132. Die carrying member 136 has a portion 140 which extends beyond the periphery of members 128, 132. Carried by member 136 is a die member 142 shown in detail in Figs. 19 and 20. This die member has at its upper end an inset notch 144 provided at its lower end with a recess 146 substantially of the shape of the protrusion to be formed in the head of the slide fastener scoop. Thus a scoop blank may be held in the die member in the position shown in broken lines in Fig. 20.

Mounted on the wall of recesses 138 facing the die member 142 and rigid with members 128, 132 is a punch member 148 shown in detail in Figs. 21 and 22. This punch member has a flat face 150 opposite the face of member 142 provided with a protruding nose or punch 152 substantially complementary to recess 146.

Figures 24, 32:
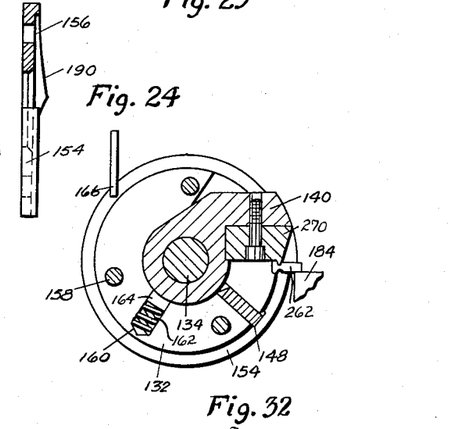
Fig. 24 shows in side elevation one of the cam discs of Fig. 15.
Fig. 32 is a view similar to Fig. 17C showing a modified form of the invention.

On the outside of members 128, 132 are discs 154. These discs are of slightly greater diameter than members 128, 132, but slightly less than the projecting portion 140 of carrier 136. These discs 154 have on their inner radial faces recesses 156 (see Fig. 24) so that they fit partly over and around drum members 128, 132. The parts 154 and the drum members 128, 132 are secured together as a unit by bolts 158 passing through all of them.

Drums 128, 132 have a recess 160 in which is arranged a coil spring 162 engaging a friction member 164 and pushing it against the surface of die carrier 136. This arrangement causes carrier 136 to move along in normal operation with the drums until its movement is stopped in a manner to be described below.

Stationary knife member 64 has a downward extension 166 located in the position shown particularly in Figs. 17A to 17D between the peripheries of the discs 154. This extension lies in the path of the outer part 140 of the carrier 136 so as to limit its movement in a counter-clockwise direction.

Figure 28:
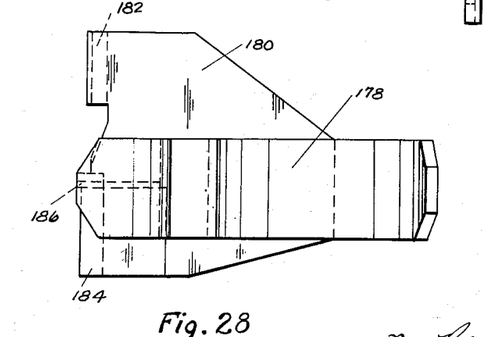
Fig. 28 is a side elevation of one of the tape clamping and scoop setting members.
Figure 29:
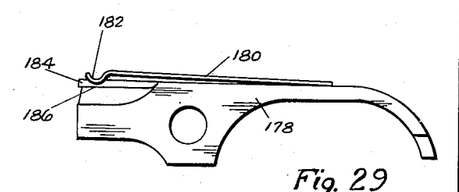
Fig. 29 is a top plan view thereof.
Figure 30:
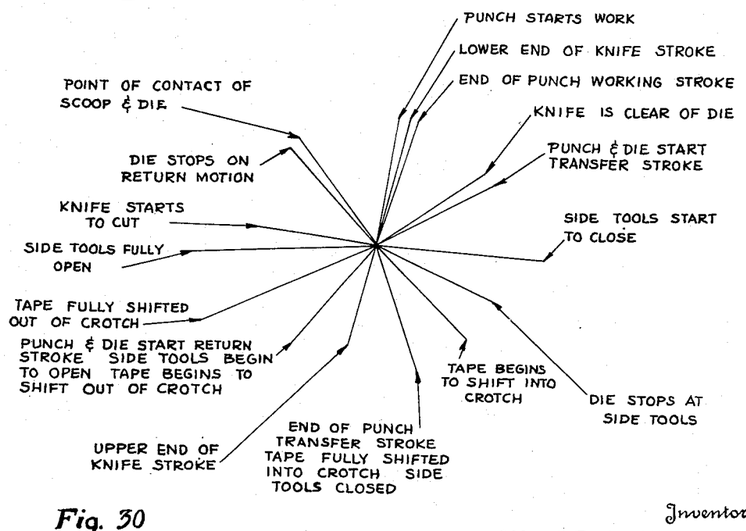
Fig. 30 is a timing diagram of the machine.

On the front face of the machine is arranged the mechanism for setting the scoop element on the tape. This is shown particularly in Figs. 27 to 29. Projecting from the front face of the casing 4 are arms 170 in which are pivoted at 171 levers 172. These levers have at their outer ends recesses in which engage coil springs 174 resting with their other ends against the casing 4, so that the inner ends of levers 172 which are located opposite the drum mechanism are urged inwardly towards this drum. Pivoted at 176 on the inner ends of arms 172 are tape gripping and scoop clamping levers or side tools 178. These side tools have on their inner faces tape gripping members 180 formed of spring sheet metal and having at their free ends, that is at the ends nearest the drum mechanism, recessed grooves 182 facing towards each other.

Figures 25, 27:
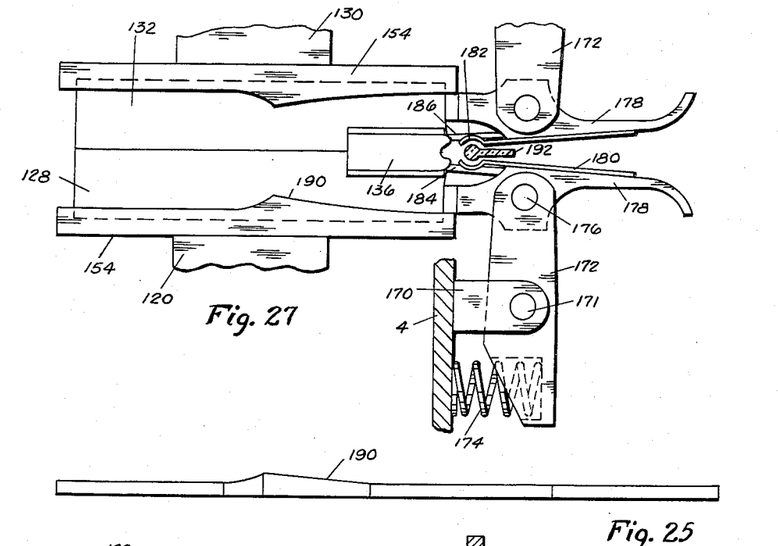
Fig. 25 is a developed view of the radial cam face of such a disc.
Fig. 27 is a top plan view of the tape shifting and scoop setting mechanism.

On the lower part, adjacent the drum mechanism, side tools 178 carry plates 184 providing a stop mechanism to operate in the manner to be described. These stop members 184 are likewise of spring metal and their inner ends are secured to the side tools 178. Just above stop members 184 side tools 178 have projecting hardened faces 186. The free ends of side tools 178, as shown in Fig. 27, engage between the outer parts of the radial faces of disc 154.

Figures 6, 13, 23, 26:
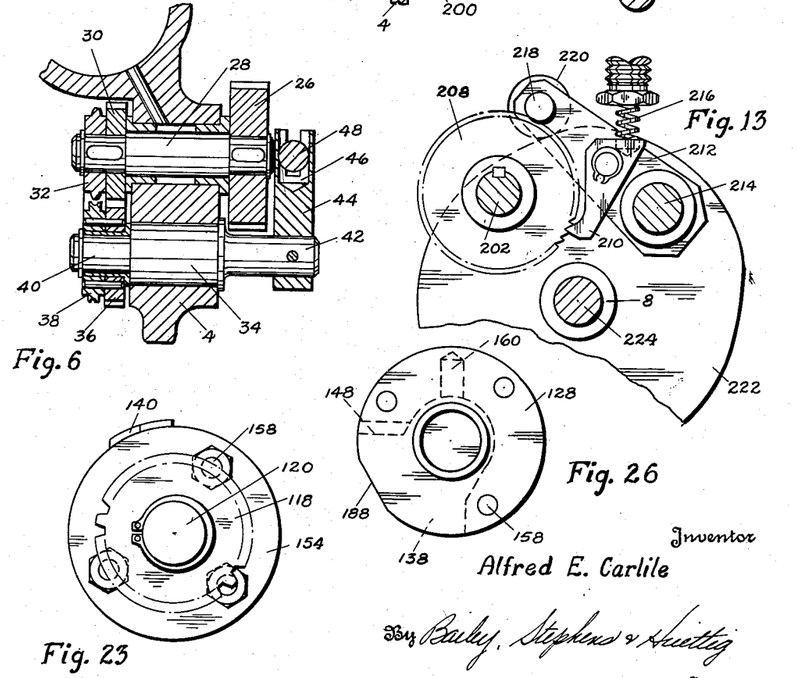
Fig. 6 is a cross-section substantially on the line 6—6 of Fig. 3.
Fig. 13 is a cross-section substantially on the line 13—13 of Fig. 1.
Fig. 23 is a view from the left end of Fig. 15.
Fig. 26 is a view of the radial face of one of the drums of Fig. 15.
Figure 7:
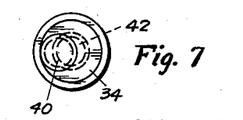
Fig. 7 is an end view of the lower wire feed roller shaft.

Drums 128, 132 have on their peripheral faces, as shown in Fig. 26, flat cam portions 188. The inwardly projecting rims of discs 154 likewise have on their radial faces cam portions 190, shown in developed form in Fig. 25. These cam surfaces are located slightly behind (counter-clockwise in Figs. 17A to 17D) the punch member 148.

Figure 12:
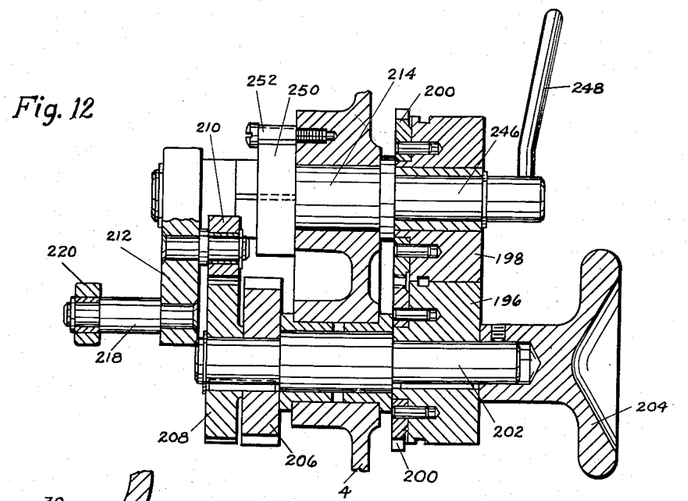
Fig. 12 is a cross-section through a part of the tape feeding mechanism substantially along the line 12—12 of Fig. 1.
Figure 14:
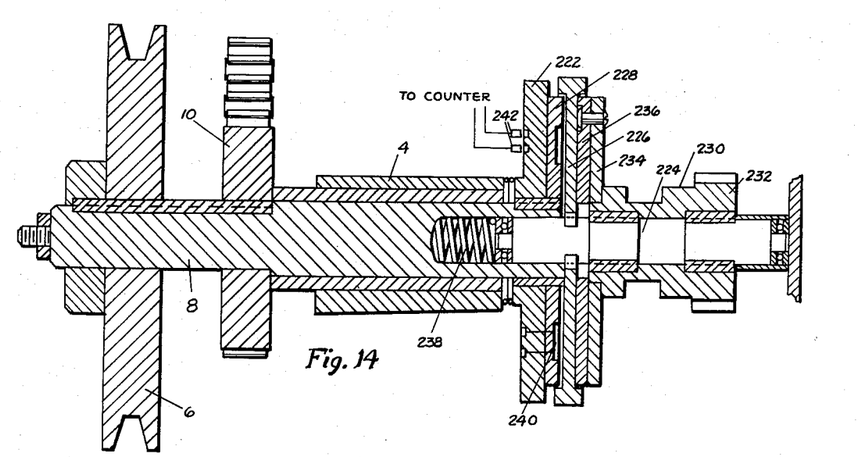
Fig. 14 is a cross-section through the tape feed drive substantially on the line 14—14 of Fig. 1.
Figures 15, 17:
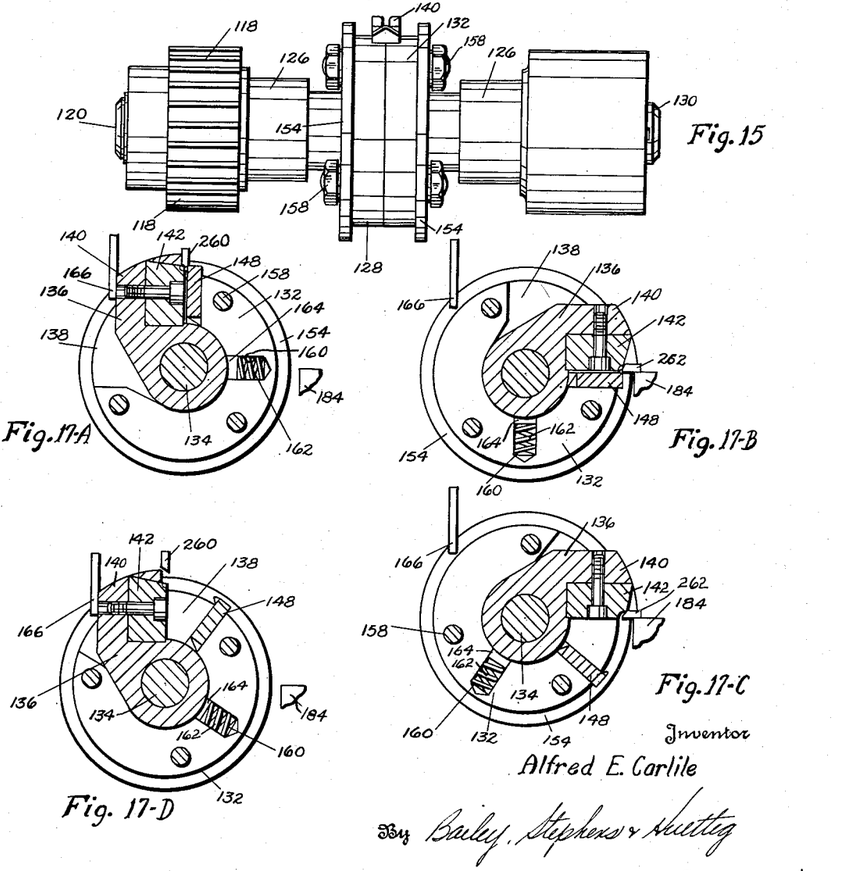
Fig. 15 shows in side elevation the scoop blank forming and carrying mechanism.
Figure 16:
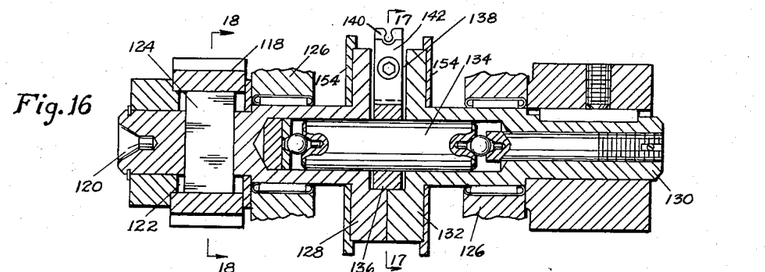
Fig. 16 is a longitudinal cross-section through the mechanism of Fig. 15.

The tape feeding and guiding mechanism is shown principally in Figs. 12 to 14. The tape 192 is fed downwardly from the top of the machine along its front face through a suitable guide 194 between side tools 178 to the tape feeding mechanism (see Figs. 1, 2 and 12). This mechanism consists of two opposed rollers 196, 198 connected to turn together by gearing 200. Roller 196 is mounted on a shaft 202 which may be turned by hand wheel 204. Shaft 202 is mounted in the frame 4 and carries on its inner end a gear 206 and a ratchet wheel 208. The ratchet wheel is engageable by a pawl 210 carried on an arm 212 pivoted on shaft 214 of wheel 198. Pawl 210 is urged into engagement with ratchet wheel 208 by coil spring 216. Arm 212 has on its end an off-set pin 218 carrying a roller 220 which engages the peripheral surface of a cam disc 222. Cam disc 222 is rigidly mounted on main drive shaft 8.

Coaxial with and extending into the hollow inner end of drive shaft 8 is a shaft 224. Keyed on this shaft is a disc 226 having a clutch face opposite a facing 228 on cam disc 222. Rotatable on shaft 224 is a sleeve 230 having a gear 232 in engagement with gear 206. Rigid with sleeve 230 is a disc 234 having a clutch face 236 engageable with the face of disc 226 opposite clutch face 228. A coil spring 238 arranged in the hollow end of shaft 8 urges shaft 224 to the right (Fig. 14). On the face of disc 228 are magnets 240 connected by suitable brushes 242 and an electric circuit to a counter 244 mounted on shaft 110 to count each revolution of the machine and therefore each setting of a scoop on the tape.

Tape feed roller 198 is mounted on an off-set or eccentric portion 246 of shaft 214, and this portion carries a hand lever 248. A coiled flat spring 250 has one end secured to shaft 214 and the other to a fixed pin 252 so as to tend to turn shaft 214 in a counter-clockwise direction (Fig. 2) so as to press said roller 198 against feed roller 196.

The mechanism above described operates as follows:

Shafts 8 and 12 are driven at the same speed. In each rotation of shaft 12, block 68 is reciprocated and knife 88 moves downwardly past fixed knife 66 to shear off a scoop blank. Because of the pressure exerted, this blank will be held in position on projection 90 of knife 88 until removed therefrom in a manner to be described below. After knife 88 returns to its upper position, clearing fixed knife 66, the mechanism shown particularly in Figs. 3 and 6, operates to advance feed wire wheels 32, 38 by one step. This is accomplished by the fact that crank pin 20 shifts pawl 22 alternately to the left and right in Fig. 3 so as to impart a step by step rotation to wheel 36 and therefrom through shaft 28 to wheel 32 and through gearing 30, 36 to wheel 38. The pressure on the wire can be adjusted by turning wheel 56 which limits the rocking of shaft 34 and thereby the movement of feed wheel 38 towards wheel 32.

Each rotation of shaft 12 also imparts a complete rotation to shaft 18 and a complete oscillation to lever 108 and thereby to segmental rack 116. This oscillation causes oscillation of gear 118, and through this gear oscillates shaft 120. Because however of the provision of notches 122 (Fig. 18) there is a period of dwell at the end of each oscillation of gear 118 in either direction, so that during a part of the time shaft 120 remains stationary.

Assuming now that the parts are in the position shown in Fig. 17C, and that the key 124 is in the position shown in Fig. 18, and that shaft 120 is turning in a counter-clockwise direction (that is, that the dwell at the beginning of the counter-clockwise rotation is ended) the parts operate as follows:

Discs 128 and 132 forming the drum start to rotate counter-clockwise. In the position shown in Fig. 17C, die holder 140 is engaging the rear or counter-clockwise wall of recess 138. The side tools or clamping levers 178 have been shifted inwardly towards each other against a scoop, and also shifted inwardly towards the drum mechanism so that the tape is advanced towards the radius of that mechanism.

As the counter-clockwise rotation of the drum mechanism starts, cam surface 190 gradually allows the side tools 178 to shift apart at their inner ends. At the same time, flat surface 188 moves out of the path of the noses or inner ends of these side tools so that the same are shifted away from the axis of the drum mechanism to move the tape away from this axis. During the counter-clockwise rotation from the position shown in Fig. 17C, friction member 164 causes die carrier 140 to turn with discs 128, 132 to a position spaced away from punch member 148.

By the time die holder 140 together with the scoop 262 carried thereby reaches a position to engage stop 184, the tape and the side tools have been moved completely away from the path of the punch member. The parts continue to move from the position shown in Fig. 17C in a counterclockwise direction to that shown in Fig. 17D. At this point, projection 140 of carrier 136 engages fixed stop 166 which prevents its further counterclockwise movement. Upon the continued turning of discs 128, 132, the carrier 136 remains stationary, friction member 164 sliding on its surface. As soon as the carrier reaches this stationary position, the knife feeds a scoop blank (indicated in Fig. 17C at 260) into the recess 144 of the die block 142. At substantially the moment that the knife reaches its lower position, punch member 148 which has continued to turn with discs 128, 132 reaches the position shown in Fig. 17A. When it does this, punch 152 engages the head portion of the scoop blank opposite recess 146 and shapes the head of the scoop to form a protrusion on one side and a recess on the other of any suitable type to interlock with similar protrusions and recesses on an opposing fastener stringer. At the same time, punch 148 clamps the formed scoop between it and die block 142.

Figure 18:
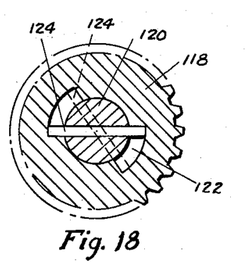
Fig. 18 is a cross-section on the line 18—18 of Fig. 16.
Figure 19:
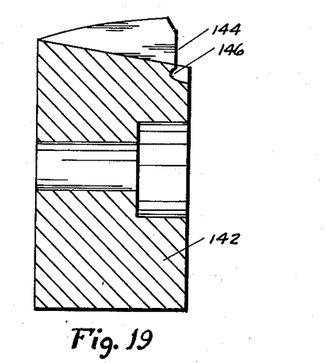
Fig. 19 is an enlarged cross-section through the die element of Figs. 15 to 18.
Figure 20:
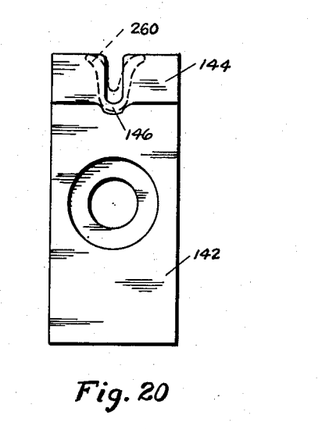
Fig. 20 is an enlarged front view thereof.

When the parts reach the position shown in Fig. 17A, key 124 occupies the broken line position shown in Fig. 18. Gear 118 now starts to turn clockwise, but does not drive shaft 120 until it has taken up the play allowed by notches 122, or until the parts occupy the relative position shown in solid lines in Fig. 18. During the dwell period so provided, shaft 120 is not turned, which gives time for the knife to withdraw from its lowest position and to leave the formed scoop gripped between die 142 and punch 148.

Now the parts shift from the position shown in Fig. 17A to that shown in Fig. 17B, carrier 136 turning with discs 128, 132 because of the friction of member 164. As the parts approach the position shown in Fig. 17B, the formed scoop 262 engages stops 184 and further travel of the carrier 136 is prevented. The discs 128, 132 continue to turn with member 164 sliding on the surface of the carrier, towards the position shown in Fig. 17C. During movement from the position of Fig. 17B to that of Fig. 17C, flat portions 188 of drums 128, 132 come opposite the inner noses of levers 178 so that these under the action of springs 174 are allowed to shift inwardly and to carry the bead of the tape 192 between the legs of the fastener element or scoop 262. At the same time, cam surfaces 190 engage the outer faces of the side tools 178, and force them towards each other so that faces 186 engage the outsides of the legs of the scoops and clamp them together on the tape.

When the parts reach the position shown in Fig. 17C, carrier 118 and shaft 120 occupy the relative position shown in solid lines in Fig. 18. Now as shaft 118 starts to turn in the opposite direction, there is a similar dwell in shaft 120 until the parts occupy the relative position shown in broken lines in Fig. 18. Thereafter the parts start to turn from the position shown in Fig. 17C to that shown in Fig. 17D in the manner previously described, and this operation is repeated step by step.

After each complete operation as described above, it is obvious that the tape must be fed forward the proper distance for receiving the next scoop. The tape feeding mechanism operates as follows:

The tape passes through guide 194, clamping members 182 and tape feeding drums 196, 198. At each rotation of shaft 8, the cam surface on disc 222 causes an oscillation of lever 212 (see Fig. 13). This through pawl 210 imparts one step of movement to ratchet wheel 208 and shaft 202. Shaft 202 drives feed wheel 196 which in turn through gear 200 guides tape feed wheel 198 so that the tape is advanced one step for each revolution of the shaft 8.

At intervals it is necessary to provide a larger gap so that groups of scoops on the tape will be separated by spaces of considerable length. For this purpose, a counter 244 which counts each revolution of shaft 110 operates after a set number of rotations of this shaft to energize a solenoid or magnet 240 on disc 222 turning with shaft 8. This magnet attracts to it clutch disc 226 and disc 234, so that these two turn at the same speed as shaft 8. This drives gear 232 which in turn rotates gear 206 rigid with shaft 202, so that tape feed wheels 196, 198 instead of being advanced merely one step for each rotation of shaft 8 are turned rapidly through a substantial angular interval so as to form a gap in the tape before the next scoop is set.

After one revolution, or a predetermined number of revolutions, of the counter shaft (i. e., of shaft 110), the solenoid or magnet is deenergized and spring 238 separates discs 226 and 234 from disc 222, so that step by step operation of the feeding mechanism is resumed. The dimensions of gears 206, 232 will determine the length of the gap between groups of scoops.

Figure 2:
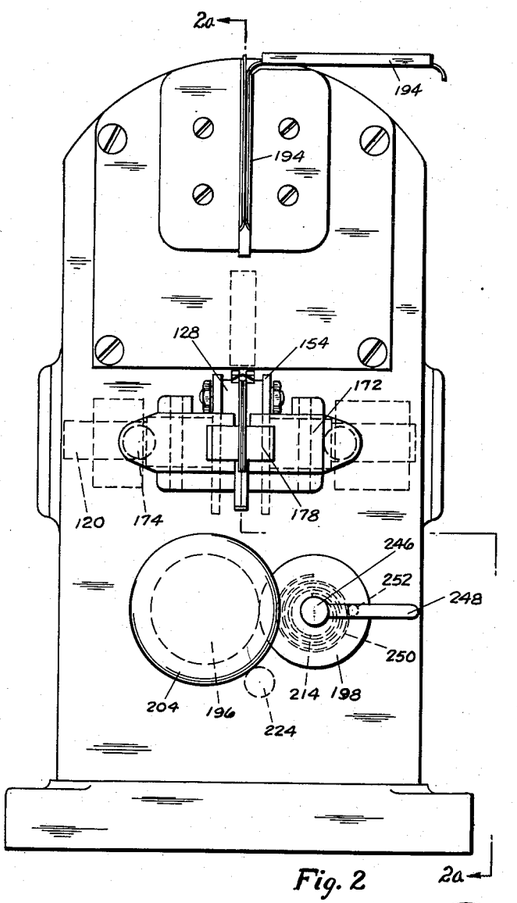
Fig. 2 is a front view thereof.
Figure 2A:
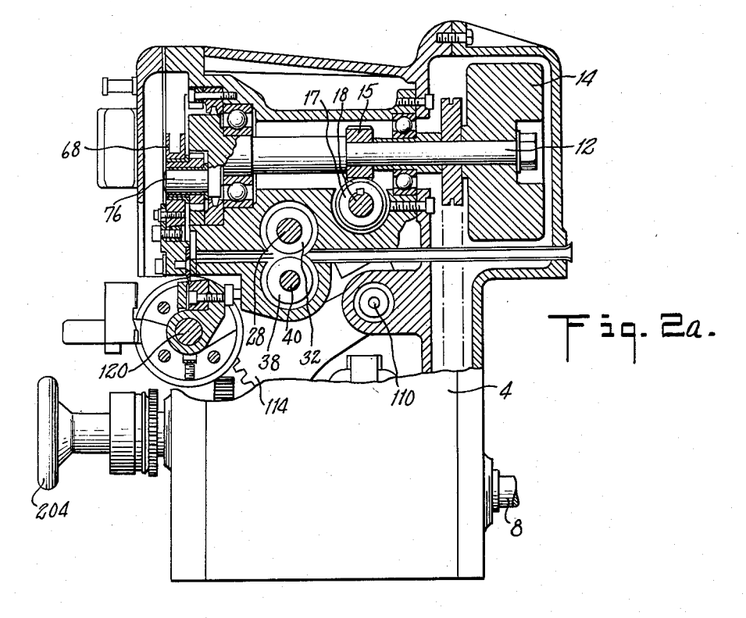
Fig. 2a is a sectional view taken on line 2a—2a of Fig. 2.
Figure 2B:
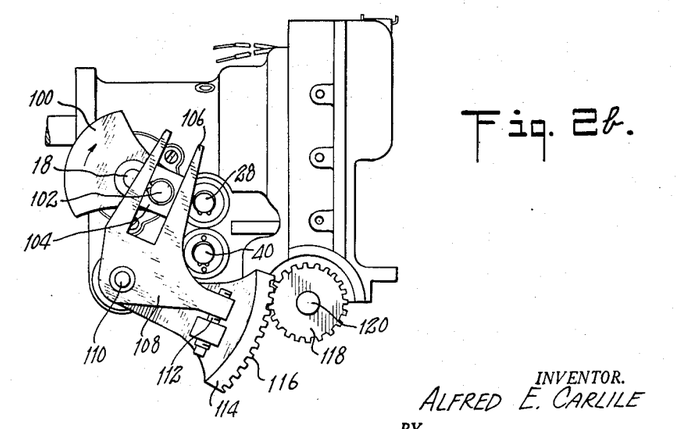
Fig. 2b is a detailed view of the co-operating parts for oscillating the forming and gripping mechanism.

For putting the tape into the machine or adjusting it, pushing downward on handle 248 will through off-set portion 246 shift wheel 198 to the right (Fig. 2). A gap is thus left through which the tape may be threaded. When handle 248 is released, coil spring 250 will turn shaft 214 and off-set portion counterclockwise in Fig. 2 so as to engage the parts resiliently together in tape feeding position.

If a "two-way" fastener is to be made, I may use (see Fig. 32) a second punch 270 cooperating with punch 148, instead of a die. This forms the known type of fastener having a head with recesses on both sides, these recesses receiving the two projecting parts of the head.

While I have described herein some embodiments of my invention, I wish it to be understood that I do not intend to limit myself thereby except within the scope of the claims hereto or hereinafter appended.

I claim:

1. A machine of the character described comprising a member mounted to oscillate between two positions, punch and die means carried by said member for gripping and forming a slide fastener scoop therebetween, means to feed a scoop blank to said first means in the first of such positions, means for moving said member together with said punch and die means carried thereby to such second position, means to feed a tape past the second position, and means adjacent the second position to clamp the legs of the scoop on the tape while being held by said punch and die means.

2. A machine of the character described comprising a member mounted to oscillate between two positions, punch and die means carried by said member for gripping and forming a slide fastener scoop therebetween, means to feed a scoop blank to said first means in the first of such positions, means for moving said member together with said punch and die means carried thereby to such second position, means to feed a tape past the second position, means adjacent the second position to clamp the legs of the scoop on the tape while being held by said punch and die means, and means controlled by oscillation of said member for actuating said last two mentioned means.

3. A machine of the character described comprising a member mounted to oscillate between two positions, punch and die means carried by said member for gripping and forming a slide fastener scoop therebetween, means to feed a scoop blank to said first means in the first of such positions, means for moving said member together with said punch and die means carried thereby to such second position, means to feed a tape past the second position, means to shift said tape towards the axis of oscillation of said member into the legs of a scoop held by said gripping and forming means, and means adjacent the second position to clamp the legs of the scoop on the tape while being held by said punch and die means.

4. A machine of the character described comprising a member mounted to oscillate between two positions, punch and die means carried by said member for gripping and forming a slide fastener scoop therebetween, means to feed a scoop blank to said first means in the first of such positions, means for moving said member together with said punch and die means carried thereby to such second position, means to feed a tape past the second position, means to shift said tape towards the axis of oscillation of said member into the legs of a scoop held by said gripping and forming means, and means adjacent the second position to clamp the legs of the scoop on the tape while being held by said punch and die means, and means controlled by oscillation of said member for actuating said last two mentioned means.

5. A machine of the character described comprising a member mounted to oscillate between two positions, punch and die means carried by said member for gripping and forming a slide fastener scoop therebetween, means to feed a preshaped wire of Y-section to a point adjacent the first of such positions, means for moving said member together with said punch and die means carried thereby to such second position, means to shear a scoop blank from the wire and feed it to said first means in such first position, means to feed a tape past the second position, and means adjacent the second position to clamp the legs of the scoop on the tape while being held by said punch and die means.

6. A machine of the character described comprising a member mounted to oscillate between two positions, punch and die means carried by said member for gripping and forming a slide fastener scoop therebetween, means to feed a preshaped wire of Y-section to a point adjacent the first of such positions, means for moving said member together with said punch and die means carried thereby to such second position, means to shear a scoop blank from the wire and feed it to said first means in such first position, means to feed a tape past the second position, means to shift said tape towards the axis of oscillation of said member into the legs of a scoop held by said gripping and forming means, and means adjacent the second position to clamp the legs of the scoop on the tape while being held by said punch and die means.

7. A machine of the character described comprising a member mounted to oscillate between two positions, punch and die means carried by said member for gripping and forming a slide fastener scoop therebetween, means to feed a preshaped wire of Y-section to a point adjacent the first of such positions, means for moving said member together with said punch and die means carried thereby to such second position, means to shear a scoop blank from the wire and feed it to said first means in such first position, means to feed a tape past the second position, means to shift said tape towards the axis of oscillation of said member into the legs of a scoop held by said gripping and forming means, means adjacent the second position to clamp the legs of the scoop on the tape while being held by said punch and die means, and means controlled by oscillation of said member for actuating said last two mentioned means.

8. A machine of the character described comprising a member mounted to oscillate between two positions, a second member mounted to turn about the same axis as said first member, means effecting a lost motion connection between said members whereby one of said members continues to move when the movement of the other of said members is arrested, said members having cooperating punch and die means thereon, means to drive said members to grip and form the head of a slide fastener scoop blank in the first of said positions with the legs of the blank extending outwardly from the axis of oscillation of the members, means to feed scoop blanks to such first position between said punch and die means, means to oscillate said members together with the punch and die means carried thereby to the second position, means to feed a tape past said second position, means to separate said members at said second position, and means adjacent the second position to clamp the legs of the scoop on the tape.

9. In a machine as claimed in claim 8, friction means between said members normally causing them to move together.

10. A machine of the character described comprising a member mounted to oscillate between two positions, a second member mounted to turn about the same axis as said first member, means effecting a lost motion connection between said members whereby one of said members continues to move when the movement of the other of said members is arrested, said members having cooperating punch and die means thereon, means to drive said members to grip and form the head of a slide fastener scoop blank in the first of said positions with the legs of the blank extending outwardly from the axis of oscillation of the members, means to feed scoop blanks to such first position between said punch and die means, means to oscillate said members together with the punch and die means carried thereby to the second position, means to feed a tape past said second position, means to separate said members at said second position, means to shift said tape towards the axis of oscillation of said members into the legs of a scoop held by said members, and means adjacent the second position to clamp the legs of the scoop on the tape.

11. A machine of the character described comprising a member mounted to oscillate between two positions, a second member mounted to turn about the same axis as said first member, means effecting a lost motion connection between said members whereby one of said members continues to move when the movement of the other of said members is arrested, said members having cooperating punch and die means thereon, means to drive said members to grip and form the head of a slide fastener scoop blank in the first of said positions with the legs of the blank extending outwardly from the axis of oscillation of the members, means to feed scoop blanks to such first position between said punch and die means, means to oscillate said members together with the punch and die means carried thereby to the second position, means to feed a tape past said second position, means to separate said members at said second position, means to shift said tape towards the axis of oscillation of said members into the legs of a scoop held by said members, means adjacent the second position to clamp the legs of the scoop on the tape, and means controlled by oscillation of said members for actuating said last two mentioned means.

12. A machine of the character described comprising a member mounted to oscillate between two positions, a second member mounted to turn about the same axis as said first member, a lost motion connection between said members, said members having cooperating punch and die means thereon, friction means between said members normally causing them to move together, stops at said two positions engageable by the second member only to limit the oscillation thereof, means to oscillate the first member, said members when separated and when said first member is moved towards the first position and said second member engages the stop adjacent thereto closing together to grip and form a scoop blank, means to feed a scoop blank to the members in such first position, said members thereafter moving towards the second position, said second member stopping when it engages the stop adjacent thereto and said first member moving therebeyond, means to feed a tape past said second position, and means adjacent the second position to clamp the legs of the scoop on the tape.

13. A machine of the character described comprising a member mounted to oscillate between two positions, a second member mounted to turn about the same axis as said first member, a lost motion connection between said members, said members having cooperating punch and die means thereon, friction means between said members normally causing them to move together, stops at said two positions engageable by the second member only to limit the oscillation thereof, means to oscillate the first member, said members when separated and when said first member is moved towards the first position and said second member engages the stop adjacent thereto closing together to grip and form a scoop blank, means to feed a scoop blank to the members in such first position, said members thereafter moving towards the second position, said second member stopping when it engages the stop adjacent thereto and said first member moving therebeyond, means to feed a tape past said second position, means to shift said tape towards the axis of oscillation of said members into the legs of a scoop held by said members, means adjacent the second position to clamp the legs of the scoop on the tape, and means controlled by oscillation of said members for actuating said last two mentioned means.

14. In a device as claimed in claim 13, said blank feeding means including means to feed a pre-shaped wire of Y-section to a point adjacent the first of such positions, and means to shear a scoop blank from the wire and feed it to said members in such first position.

15. A machine of the character described comprising a drum, means to oscillate said drum between two positions, said drum having a recess therein, a first member rigid with said drum within said recess, a second member mounted in said recess to oscillate about the same axis as said drum towards and from said first member, a frictional connection between said second member and said drum normally causing said members to turn together, said members having cooperating punch and die means thereon, stop means adjacent said two positions engageable with said second member only to limit oscillation thereof to an angle less than the angle of oscillation of the drum, said members when separated and when said first member is moved towards the first position and said second member engages the stop adjacent thereto closing together to grip and form a scoop blank, means to feed a scoop blank to the members in such first position, said members thereafter moving towards the second position, said second member stopping when it engages the stop adjacent thereto and said first member moving therebeyond, means to feed a tape past said second position, means controlled by said drum to shift said tape towards the axis of oscillation of said members into the legs of a scoop held by said members, and means adjacent the second position to clamp the legs of the scoop on the tape.

16. A machine of the character described comprising a drum, means to oscillate said drum between two positions, said drum having a recess therein, a first member rigid with said drum within said recess, a second member mounted in said recess to oscillate about the same axis as said drum towards and from said first member, a frictional connection between said second member and said drum normally causing said members to turn together, said members having cooperating punch and die means thereon, stop means adjacent said two positions engageable with said second member only to limit oscillation thereof to an angle less than the angle of oscillation of the drum, said members when separated and when said first member is moved towards the first position and said second member engages the stop adjacent thereto closing together to grip and form a scoop blank, means to feed a scoop blank to the members in such first position, said members thereafter moving towards the second position, said second member stopping when it engages the stop adjacent thereto and said first member moving therebeyond, means to feed a tape past said second position, means controlled by said drum to shift said tape towards the axis of oscillation of said members into the legs of a scoop held by said members, and means controlled by said drum to clamp the legs of the scoop on the tape.

17. A machine of the character described comprising a drum, means to oscillate said drum between two positions, said drum having a recess therein, a first member rigid with said drum within said recess, a second member mounted in said recess to oscillate about the same axis as said drum towards and from said first member, a frictional connection between said second member and said drum normally causing said members to turn together, said members having cooperating punch and die means thereon, stop means adjacent said two positions engageable with said second member only to limit oscillation thereof to an angle less than the angle of oscillation of the drum, said members when separated and when said first member is moved towards the first position and said second member engages the stop adjacent thereto closing together to grip and form a scoop blank, means to feed a scoop blank to the members in such first position, said members thereafter moving towards the second position, said second member stopping when it engages the stop adjacent thereto and said first member moving therebeyond, means to feed a tape past said second position, movable means adjacent said second position engageable with the tape to grip the same, means including cam means on said drum to move said means to shift said tape towards the axis of oscillation of said members into the legs of a scoop held by said members, and means adjacent the second position to clamp the legs of the scoop on the tape.

18. In a device as claimed in claim 17, said movable means including pivoted levers, and tape engaging members mounted on said levers, and said moving means including springs acting on said levers to urge said tape engaging members toward the axis of oscillation of the drum, said cam means including a peripheral cam surface on the drum against which said tape engaging members abut.

19. In a device as claimed in claim 18, the stop means adjacent the second position being mounted on said tape engaging means.

20. In a device as claimed in claim 19, said leg clamping means including clamping members carried by said levers, said drum having radial cam surfaces engageable with said clamping members to press them together against the legs of a scoop.

21. In a device as claimed in claim 20, said drum oscillating means including means to move said drum intermittently in opposite directions.

22. In a device as claimed in claim 17, said movable means including pivoted levers, and tape engaging members mounted on said levers, said moving means including springs acting on said levers to urge said tape engaging members toward the axis of oscillation of the drum, said cam means including a peripheral cam surface on the drum against which said tape engaging members abut, and said leg clamping means including clamping members carried by said levers, said drum having radial cam surfaces engageable with said clamping members to press them together against the legs of a scoop.

23. In a device as claimed in claim 17, said movable means including pivoted levers, clamping members pivoted on said levers, tape engaging members carried by said clamping members, said moving means including springs acting on said levers to urge said clamping and tape engaging members toward the axis of oscillation of the drum, said cam means including a peripheral cam surface on the drum against which said tape engaging members abut, said drum having radial cam surfaces engageable with said clamping members to press them together against the legs of a scoop.

24. In a device as claimed in claim 17, said leg clamping means including clamping members carried by said levers, said drum having radial cam surfaces engageable with said clamping members to press them together against the legs of a scoop.

25. In a device as claimed in claim 24, the stop means adjacent the second position being mounted on said clamping members.

26. A machine of the character described comprising a member mounted to oscillate between two positions, a second member mounted to turn about the same axis as said first member, means effecting a lost motion connection between said members whereby one of said members continues to move when the movement of the other of said members is arrested, said members having cooperating scoop gripping means thereon, means to drive said members to grip the head of a slide fastener scoop in the first of said positions with the legs of the blank extending outwardly from the axis of oscillation of the members, means to feed scoops to such first position, means to oscillate said members to the second position, means to feed a tape past said second position, means to separate said members at said second position, and means adjacent the second position to clamp the legs of the scoop on the tape.

27. In a machine as claimed in claim 26, friction means between said members normally causing them to move together.

28. A machine of the character described comprising a member mounted to oscillate between two positions, a second member mounted to turn about the same axis as said first member, means effecting a lost motion connection between said members whereby one of said members continues to move when the movement of the other of said members is arrested, said members having cooperating scoop gripping means thereon, means to drive said members to grip the head of a slide fastener scoop in the first of said positions with the legs of the blank extending outwardly from the axis of oscillation of the members, means to feed scoops to such first position, means to oscillate said members to the second position, means to feed a tape past said second position, means to separate said members at said second position, means to shift said tape towards the axis of oscillation of said members into the legs of a scoop held by said members, and means adjacent the second position to clamp the legs of the scoop on the tape.

29. A machine of the character described comprising a member mounted to oscillate between two positions, a second member mounted to turn about the same axis as said first member, means effecting a lost motion connection between said members whereby one of said members continues to move when the movement of the other of said members is arrested, said members having cooperating scoop gripping means thereon, means to drive said members to grip the head of a slide fastener scoop in the first of said positions with the legs of the blank extending outwardly from the axis of oscillation of the members, means to feed scoops to such first position, means to oscillate said members to the second position, means to feed a tape past said second position, means to separate said members at said second position, means to shift said tape towards the axis of oscillation of said members into the legs of a scoop held by said members, means adjacent the second position to clamp the legs of the scoop on the tape, and means controlled by oscillation of said members for actuating said last two mentioned means.

30. A machine of the character described comprising a member mounted to oscillate between two positions, a second member mounted to turn about the same axis as said first member, a lost motion connection between said members, said members having cooperating scoop gripping means thereon, friction means between said members normally causing them to move together, stops at said two positions engageable by the second member only to limit the oscillation thereof, means to oscillate the first member, said members when separated and when said first member is moved towards the first position and said second member engages the stop adjacent thereto closing together to grip a scoop, means to feed a scoop to the members in such first position, said members thereafter moving towards the second position, said second member stopping when it engages the stop adjacent thereto and said first member moving therebeyond, means to feed a tape past said second position, and means adjacent the second position to clamp the legs of the scoop on the tape.

31. A machine of the character described comprising a member mounted to oscillate between two positions, a second member mounted to turn about the same axis as said first member, a lost motion connection between said members, said members having cooperating scoop gripping means thereon, friction means between said members normally causing them to move together, stops at said two positions engageable by the second member only to limit the oscillation thereof, means to oscillate the first member, said members when separated and when said first member is moved towards the first position and said second member engages the stop adjacent thereto closing together to grip a scoop, means to feed a scoop to the members in such first position, said members thereafter moving towards the second position, said second member stopping when it engages the stop adjacent thereto and said first member moving therebeyond, means to feed a tape past said second position, means to shift said tape towards the axis of oscillation of said members into the legs of a scoop held by said members, means adjacent the second position to clamp the legs of the scoop on the tape, and means controlled by oscillation of said members for actuating said last two mentioned means.

32. A machine of the character described comprising a drum, means to oscillate said drum between two positions, said drum having a recess therein, a first member rigid with said drum within said recess, a second member mounted in said recess to oscillate about the same axis as said drum towards and from said first member, a frictional connection between said second member and said drum normally causing said members to turn together, said members having cooperating means to grip the head of a scoop with the legs pointing outwardly from the axis of oscillation of the drum, stop means adjacent said two positions engageable with said second member only to limit oscillation thereof to an angle less than the angle of oscillation of the drum, said members when separated and when said first member is moved towards the first position and said second member engages the stop adjacent thereto closing together to grip a scoop, means to feed a scoop to the members in such first position, said members thereafter moving towards the second position, said second member stopping when it engages the stop adjacent thereto and said first member moving therebeyond, means to feed a tape past said second position, means controlled by said drum to shift said tape towards the axis of oscillation of said members into the legs of a scoop held by said members, and means adjacent the second position to clamp the legs of the scoop on the tape.

33. A machine of the character described comprising a drum, means to oscillate said drum between two positions, said drum having a recess therein, a first member rigid with said drum within said recess, a second member mounted in said recess to oscillate about the same axis as said drum towards and from said first member, a frictional connection between said second member and said drum normally causing said members to turn together, said members having cooperating means to grip the head of a scoop with the legs pointing outwardly from the axis of oscillation of the drum, stop means adjacent said two positions engageable with said second member only to limit oscillation thereof to an angle less than the angle of oscillation of the drum, said members when separated and when said first member is moved towards the first position and said second member engages the stop adjacent thereto closing together to grip a scoop, means to feed a scoop to the members in such first position, said members thereafter moving towards the second position, said second member stopping when it engages the stop adjacent thereto and said first member moving therebeyond, means to feed a tape past said second position, said members thereafter moving towards the second position, said second member stopping when it engages the stop adjacent thereto and said first member moving therebeyond, means to feed a tape past said second position, means controlled by said drum to shift said tape towards the axis of oscillation of said members into the legs of a scoop held by said members, and means controlled by said drum to clamp the legs of the scoop on the tape.

34. A machine of the character described comprising a drum, means to oscillate said drum between two positions, said drum having a recess therein, a first member rigid with said drum within said recess, a second member mounted in said recess to oscillate about the same axis as said drum towards and from said first member, a frictional connection between said second member and said drum normally causing said members to turn together, said members having cooperating means to grip the head of a scoop with the legs pointing outwardly from the axis of oscillation of the drum, stop means adjacent said two positions engageable with said second member only to limit oscillation thereof to an angle less than the angle of oscillation of the drum, said members when separated and when said first member is moved towards the first position and said second member engages the stop adjacent thereto closing together to grip a scoop, means to feed a scoop to the members in such first position, said members thereafter moving towards the second position, said second member stopping when it engages the stop adjacent thereto and said first member moving therebeyond, means to feed a tape past said second position, movable means adjacent said second position engageable with the tape to grip the same, means including cam means on said drum to move said means to shift said tape towards the axis of oscillation of said members into the legs of a scoop held by said members, and means adjacent the second position to clamp the legs of the scoop on the tape.

35. In a device as claimed in claim 34, said movable means including pivoted levers, and tape engaging members mounted on said levers.

and said moving means including springs acting on said levers to urge said tape engaging members toward the axis of oscillation of the drum, said cam means including a peripheral cam surface on the drum against which said tape engaging members abut.

36. In a device as claimed in claim 35, said leg clamping means including clamping members carried by said levers, said drum having radial cam surfaces engageable with said clamping members to press them together against the legs of a scoop.

37. In a device as claimed in claim 36, the stop means adjacent the second position being mounted on said tape engaging means.

38. A machine of the class described comprising movable means for transferring a slide fastener scoop from a forming station to an attaching station, means carried by said movable means for gripping securely a scoop blank and forming the same at said forming station, means to feed a scoop blank to gripping and forming means of said movable means at said forming station, means for moving said movable means together with said forming and gripping means and said formed scoop so as to transfer said scoop from said forming station to said attaching station, and means adjacent said attaching station for clamping the legs of the scoop to a flexible carrier while being held by said forming and gripping means.

39. A machine of the class described, as defined in claim 38, wherein means for gripping securely a scoop blank and forming the same includes a punch member and a die member between which the scoop blank is disposed and formed.

40. A machine of the class described comprising a member mounted to oscillate between two positions, a second member mounted to turn on the same axis as said first member, cooperative means carried by said members for gripping a scoop therebetween at such first position, means for feeding a scoop to said cooperative means between said members at said first position, means for rotating both of said members so as to move said scoop to such second position, and means adjacent said second position for clamping the legs of the scoop to a flexible carrier while being held by said gripping means.

41. A machine of the class described comprising a member mounted to oscillate between two positions, a punch and die carried by said member for gripping and forming a slide fastener scoop, means for feeding a scoop blank between said punch and die at such first position, means for rotating said member so as to move said punch and die together with the scoop clamped therebetween to such second position, and means adjacent said second position for clamping the legs of the scoop to a flexible carrier while being held by said punch and die.

42. A machine of the class described comprising a shaft, a member mounted on said shaft to oscillate between two positions, cooperative means carried by said member for forming the head of a scoop, a second member mounted to turn about the same axis as said first member, means carried by said second member which cooperates with said cooperative means on said first member for forming said scoop, means for feeding scoop blanks to such first position between said scoop forming means carried by the respective first and second members, means to oscillate said members between said first and second positions, means for arresting the movement of one of said members at said second position upon rotation of the members in one direction so as to separate them, and means adjacent said second position for clamping the legs of the scoop to a flexible carrier.

43. A machine of the class described, as defined in claim 42, including means for arresting the movement of one of said members at said first position upon rotation in the opposite direction.

ALFRED E. CARLILE.

References Cited in the file of this patent

UNITED STATES PATENTS

| Number | Name | Date |
|---|---|---|
| 1,467,015 | Sundback | Sept. 4, 1923 |
| 2,001,591 | Sundback | May 14, 1935 |
| 2,148,581 | Reiter | Feb. 28, 1939 |
| 2,241,893 | Tuttle | May 13, 1941 |
| 2,245,031 | Gottlieb | June 10, 1941 |
| 2,297,426 | Nagele | Sept. 29, 1942 |
| 2,335,034 | Winterhalter | Nov. 23, 1943 |
| 2,336,662 | Wintriss | Dec. 14, 1943 |
| 2,376,335 | Braendel et al. | May 22, 1945 |
| 2,376,654 | Braendel et al. | May 22, 1945 |
| 2,594,691 | Simpson | Apr. 29, 1952 |